United States Patent
Park

(10) Patent No.: US 7,831,696 B2
(45) Date of Patent: Nov. 9, 2010

(54) APPARATUS FOR PROVIDING DEVICE INFORMATION VIA NETWORK AND A METHOD THEREOF

(75) Inventor: In-ho Park, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 1351 days.

(21) Appl. No.: 10/377,746

(22) Filed: Mar. 4, 2003

(65) Prior Publication Data

US 2003/0177271 A1 Sep. 18, 2003

(30) Foreign Application Priority Data

Mar. 12, 2002 (KR) ................ 2002-13168

(51) Int. Cl.
*G06F 15/173* (2006.01)
(52) U.S. Cl. ...................... 709/223; 709/224
(58) Field of Classification Search ........ 709/205, 709/206, 219, 223, 224, 203, 230; 710/15–19; 715/736; 379/92.01, 92.02, 92.03, 102.02, 379/102.03, 102.05, 102.07, 106.01; 340/5.8, 340/825; 700/62
See application file for complete search history.

(56) References Cited

U.S. PATENT DOCUMENTS

| | | | | |
|---|---|---|---|---|
| 6,466,971 | B1 * | 10/2002 | Humpleman et al. | 709/220 |
| 6,510,212 | B2 * | 1/2003 | Ito et al. | 379/102.03 |
| 6,804,708 | B1 * | 10/2004 | Jerding et al. | 709/220 |
| 6,826,267 | B2 * | 11/2004 | Daum et al. | 379/102.03 |
| 6,925,481 | B2 * | 8/2005 | Singhal et al. | 709/200 |
| 2001/0052862 | A1 | 12/2001 | Roelofs | |
| 2002/0029256 | A1 | 3/2002 | Zintel et al. | |
| 2003/0023704 | A1 * | 1/2003 | Lee et al. | 709/217 |
| 2003/0105854 | A1 * | 6/2003 | Thorsteinsson et al. | 709/223 |

FOREIGN PATENT DOCUMENTS

| | | |
|---|---|---|
| JP | 10-191463 A | 7/1998 |
| JP | 11-187061 A | 7/1999 |
| JP | 2000-90025 A | 3/2000 |
| JP | 2000-235547 A | 8/2000 |

(Continued)

OTHER PUBLICATIONS

Moyer S et al. "Framework draft for networked Appliances using the Session Initiation Protocol", IETF Internet Draft, Jul. 2000, pp. 1-37, XP002193189.

*Primary Examiner*—Aaron Strange
(74) *Attorney, Agent, or Firm*—Sughrue Mion, PLLC

(57) ABSTRACT

Disclosed is an apparatus for providing device information via a network and method thereof. A message processing unit processes input and output messages. The information producing unit dynamically produces updated information based on the data stored in the database and provides it in a web document format. The information managing unit manages characteristic information and additional information of a device. The data processing unit processes a transaction of the data stored in the database. The characteristic information and the additional information of the device existing in the home network created in an XML format is converted into a predetermined document structure and stored in the database. Accordingly, the remote users can have different access authority from each other by assuring independence between the domestic devices and the remote devices, and easily use the home network service by providing the device information in a web document format.

8 Claims, 6 Drawing Sheets

FOREIGN PATENT DOCUMENTS

| | | |
|---|---|---|
| JP | 2001-7836 | 1/2001 |
| JP | 2001-285308 | 10/2001 |
| JP | 2001-285313 A | 10/2001 |
| JP | 2002-7421 A | 1/2002 |
| WO | WO 98/53581 A1 | 11/1998 |
| WO | WO 99/57837 A2 | 11/1999 |
| WO | WO 02/15522 A2 | 2/2002 |

* cited by examiner

APPARATUS FOR PROVIDING DEVICE INFORMATION VIA NETWORK AND A METHOD THEREOF

BACKGROUND OF THE INVENTION

1. Field of the Invention

The present invention relates to an apparatus for providing device information via a network, and more particularly, to an apparatus for providing information on the devices in a home network through a communication network and a method thereof. The present application is based on Korean Patent Application No. 2002-13168, filed on Mar. 12, 2002, which is incorporated herein by reference.

2. Description of the Prior Art

Domestic devices can be divided into an information devices group such as a personal computer, a fax machine, a scanner, and a printer, an A/V devices group such as a television, a set-top box, a DVD, a VCR, an audio system, a camcorder, and a domestic game system, a control devices group such as a coffee maker, an electric rice cooker, a refrigerator, a washing machine, a microwave oven, and a camera, and a dummy devices group such as a remote controller, an interphone, a sensor, and a lighting device. These devices are connected to a sub-network incorporating a communication means such as a telephone line, a wireless LAN, a blue tooth, USB, IEEE1394, and a power line according to each category.

FIG. 1 is a drawing showing a general home-network structure.

Referring to FIG. 1, a telephone 120a, a notebook computer 120b, a fax machine 120c and a computer 120d are connected with the telephone line 120, and these form an independent network. A notebook computer 130a and a PDA 130b are connected with the wireless LAN or the blue tooth network 130. A computer 140a, a printer 140b and a scanner 140c are connected with the USB network 140. The IEEE1394 150 is a communication protocol for A/V devices and a television 150a, a camcorder 150b and an audio system 150c are connected to it. Control devices such as a coffee maker 160a, an electric rice cooker 160b, a refrigerator 160c, and a washing machine 160d are connected with a power line 160. These sub-networks 120, 130, 140, 150, and 160 are all mutually connected through connection devices 170 such as a bridge and construct a home-network 100. A gateway 110 has a function as a path connecting the devices in the sub-network to the external networks.

However, since the conventional home-network 100 uses existing networks such as a telephone line and a power line, and new networks such as a blue tooth network and a wireless LAN together and these devices are operated in different hardware and software platforms, it is not easy to form a home-network using a single system. Accordingly, as a method of structuring a home-network, suggested is a common virtual computing environment called a middleware residing between an application program and a computer operating system or a network operating system.

Currently, various types of middleware structure are suggested for a home-network. The main structures are control structures using a Peer to Peer method, Java object transmission method, and a particular network media function. However, in regard to the first and the second methods, while it is possible to control devices it is difficult to provide a control function with respect to the whole home network. In addition, the structure using the particular network media function is the structure not for the home network service with respect to all domestic devices but for a home sub network service with respect to particular devices.

Meanwhile, these middleware structures cannot provide services through the internet with each function. If such middleware structures are adapted, a converting device or converting software is required for converting the data structure in the middle to provide services via the internet. However, they only provide a communication function via the internet. Hence, it is not possible to provide the home network information or the information on the devices in the home network to the user's device connected to the internet, and to provide the services requested from the user's device based on the provided information.

SUMMARY OF THE INVENTION

The object of the present invention is to provide an apparatus for providing a control means not only for devices in the home network but also for devices themselves, and providing device information on the devices in the home network to the user device connected to the internet via a network and a method thereof.

In order to achieve the above object, the apparatus for providing device information via network according to the present invention comprises a message processing unit converting device information including one or more among basic information, a service list, and a status parameter list of a domestic device into database schema based on a registration request message received from the domestic devices, a storage unit storing the device information of the converted domestic device, a data processing unit processing transaction of the device information in an Extensible Markup Languages(XML) format stored in the storage unit in responding to an information request of the domestic device, and an information producing unit producing device information in the web page format based on the device information of the domestic device in the XML format received from the data processing unit and providing the produced device information to the message processing unit when the request for information is made by a user.

Preferably, the message processing unit outputs a polling message for polling whether the domestic device is in an active mode or not, and renewing device information of the domestic device stored in the storage unit based on a reply message to the polling message received from the domestic device.

Preferably, the apparatus for providing device information via network further comprises an information managing unit receiving additional information including both or either location information and/or identification information of the domestic device from a user and providing the received additional information to the message processing unit when registering the domestic device, and wherein the message processing unit requests the additional information to the information managing unit when the registration request message is received from the domestic device.

The basic information comprises device type information including one or more among a device type, a serial number, and a manufacturer, and a device ID assigned to the domestic device.

In order to achieve the another object, a method of providing device information via network comprising steps of (a) receiving device information including basic information, a service list, and a status parameter list of the domestic device created in an XML format from a domestic device, (b) converting the device information into a predetermined database schema and storing the same, (c) receiving a request for provision of the device information, and (d) converting format of the requested device information into web page format and providing the same to the user.

Preferably, the step (a) further comprises a step of (a1) adding additional information including one or more among location information and identification information of the domestic device input by the user to the device information. In the step (a1), if the additional information is not received from the user within predetermined time, the additional information given a default value is added to the device information.

Preferably, the method of providing device information via network further comprises a step of (c1) approving access of the user based on a user ID input by the user and a password before step (d) and the step (d) is performed when access of the user is approved. Furthermore, the user's access authority is identified and a different access authority is given to the users in the step (c1), and the device information of the domestic device is provided according to the access authority given to the user in the step (d).

BRIEF DESCRIPTION OF THE DRAWINGS

The aforementioned object and characteristic of the present invention will be more apparent by describing a preferred embodiment of the present invention with reference to the accompanying drawings, in which.

DETAILED DESCRIPTION OF THE PREFERRED EMBODIMENT

Figure 1:
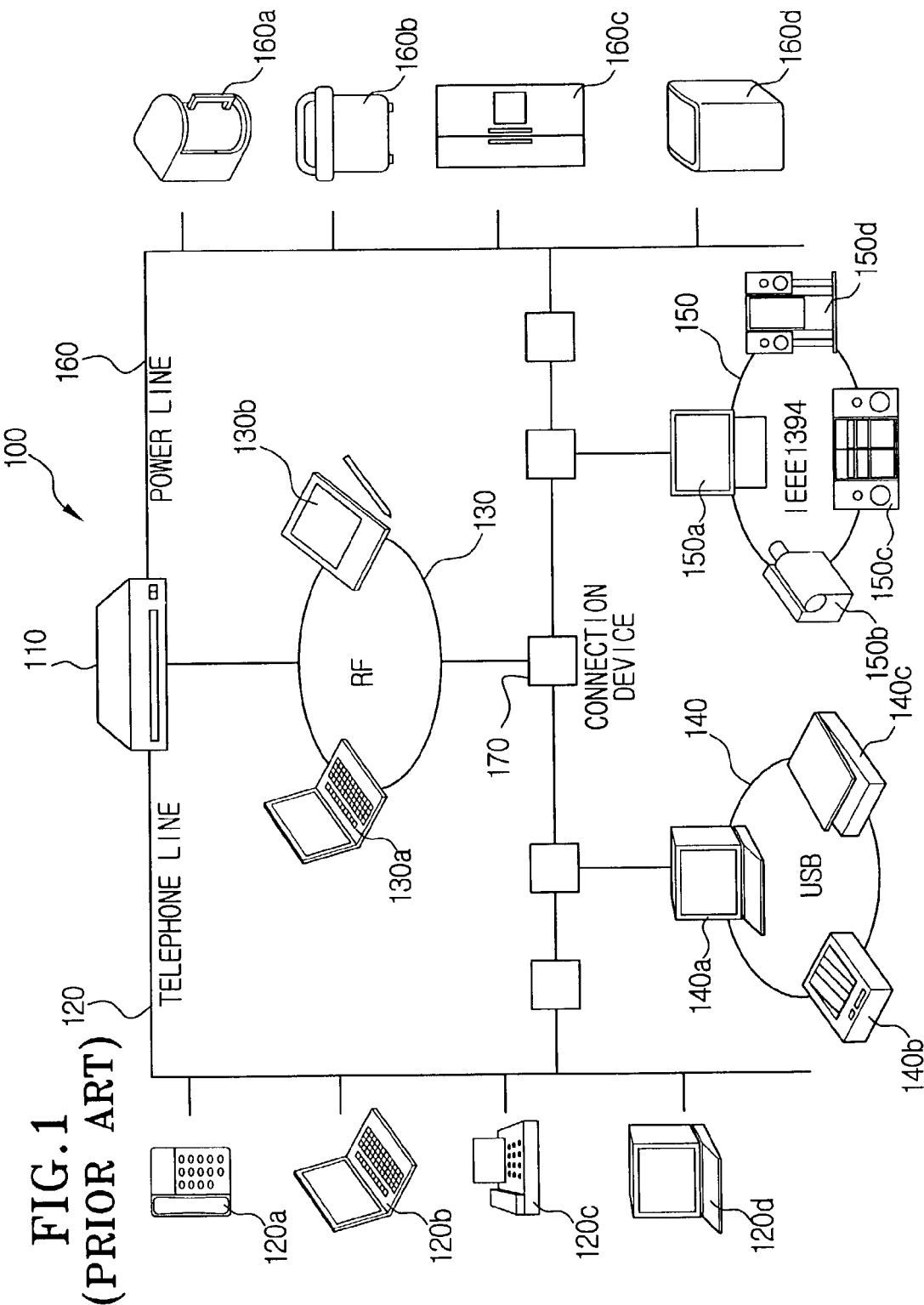
FIG. 1 is a drawing showing a conventional home-network structure.

Hereinafter, a preferred embodiment of the present invention will be described in more detail with reference to the accompanying drawings. The same reference number in the drawings indicates the same structural element.

Figure 2:
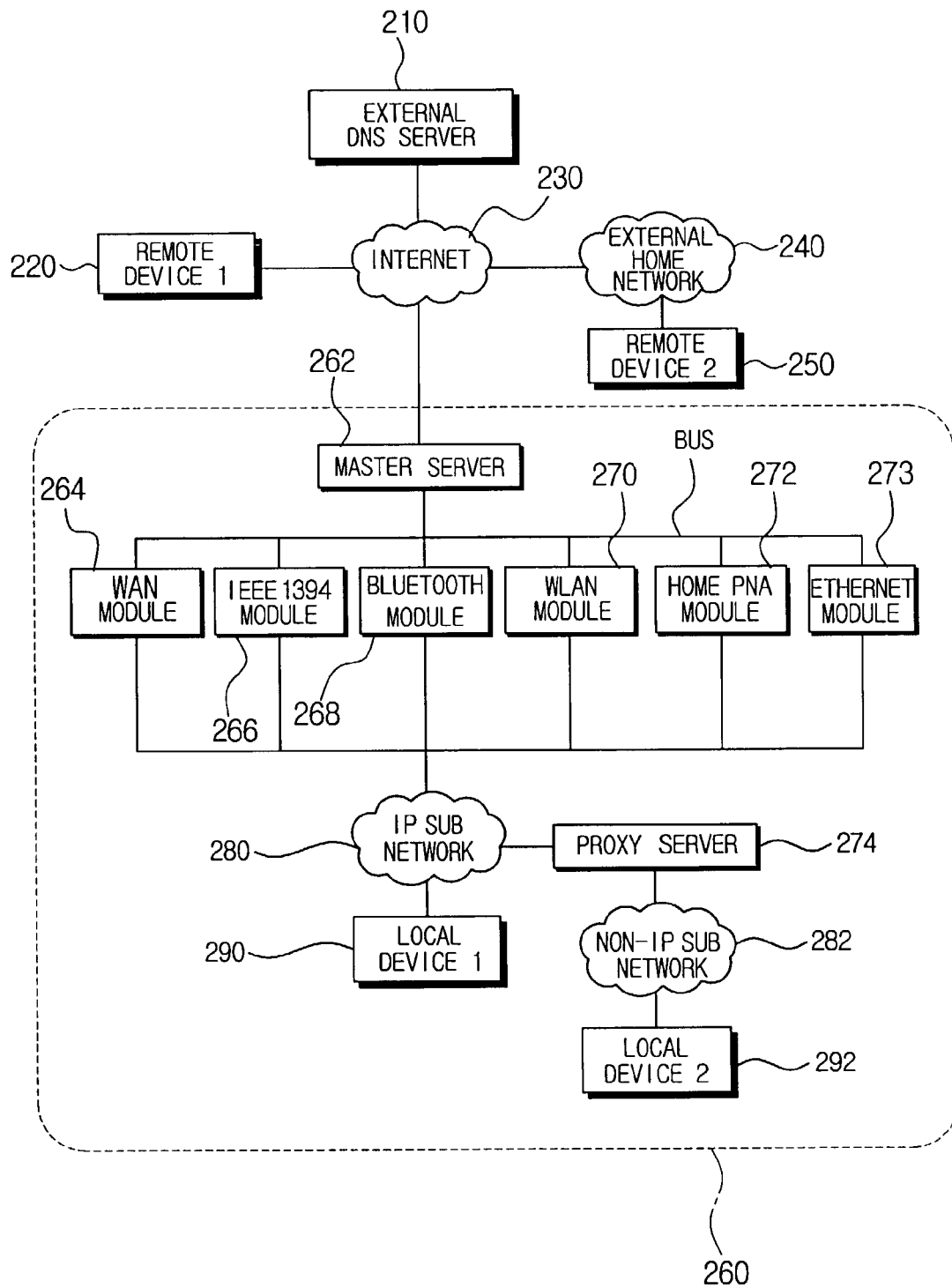
FIG. 2 is a drawing showing a home network structure having an apparatus for providing device information through a network according to the present invention.

FIG. 2 is a drawing showing a home network structure having an apparatus for providing device information through a network according to the present invention.

Referring to FIG. 2, the whole network comprises an external network and a home-network 260. The external network has an external DNS server 210 connected with internet 230, a remote device 1 220, and an external home network 240. The external home network 240 is connected with a remote device 2 250.

The external DNS server 210 stores registered public IP addresses currently assigned to the URL of the home-network 260 and the home network 260 by a master server 262 and therefore enables the connection to the home-network 260 from the external network(240).

The home-network 260 comprises the master server 262, a WAN module 264, an IEEE1394 module 266, a bluetooth module 268, a wLAN module 270, a HomePNA module 272 and an Ethernet module 273. Each module from 264 to 273 is connected to the master server 262 via a bus.

The WAN (Wide Area Network) module 264, the IEEE1394 module 266, the bluetooth module 268, the wLAN (wireless Local Area Network) module 270, the HomePNA module 272, and the Ethernet module 273 provide means for receiving data from the devices communicating by each protocol or transferring data to the corresponding devices. The detailed description of the communication process between each module and the devices connected to the corresponding module is omitted as it is generally known to those skilled in the art.

Also, the home-network 260 has an IP sub network 280 and a non-IP sub network 282. The IP sub network 280 is comprised of intelligent devices, i.e., a local device 1 290, and the non-IP sub network 282 is comprised of non-intelligent devices, i.e., a non-local device 2 292 such as a dummy device. The dummy devices do not have a self controllability and are devices such as an electric light, a door and a washing machine, which operate according to simple principles.

The basic protocol within the home-network 260 uses the TCP/IP and identifies all nodes in the home-network 260 by IP addresses as a method of assigning a particular node in an environment to which a plural number of nodes are connected through a network.

The master server 262 is an access node enabling the home-network 260 to communicate with an external network such as other external home network 240 and the internet 230. Therefore, in the master server 262, conversion between a private IP address allocated to the home network device and a global IP address used in the external network such as the internet occurs.

The master server 262 processes data transmitted from or to each module. Also, the master server 262 provides information on devices through a network. In order to do that, the master server 262 manages the information on the devices inside the home-network 260 and provides information on the registered devices by replying to the request for information on devices. In addition, as the master server 262 manages the private IP addresses allocated to the devices within the home-network 260, all nodes inside the home-network 260 can exchange information regardless of a network media interface. Furthermore, the master server 262 enables communication between the home-network 260 and the external device by registering the global IP address allocated to the URL of the home-network 260 and the home-network 260 to the external DSN server 210. The master server 262 performing function of a gateway is disclosed in the drawing and the above description but the gateway can be provided as a device separate from the master server 262.

The master server 262 has a DNS server (not shown) and a DHCP server (not shown).

The DNS server provides a host name to a device in the home-network 260. The host name of the device in the home-network 260 may be given by a user or can be a default name pre-made to indicate a functional meaning of the device. When the same default name already exists, extended numbers are added. The host name is used to request for assignment of the private IP address of the device to the DHCP. The DHCP provides a peculiar identifier, i.e., a private IP address, to devices in the home-network 260. The function of such DNS server can be performed by the information management unit described later. In that case, the DNS server and the DHCP can be removed.

The proxy server 274 converts the service in the application level in order to transmit the service using the IP networking to the non-IP node. The proxy server 274 enables each device to have the private IP address allocated from the DHCP server for each device (hereinafter called a non-IP device) connected to the non-IP sub net 282 in order to connect the device, which does not support the TCP/IP to the home-network 260.

In addition, the proxy server 274 is aware of the status of the non-IP node. In other words, the proxy server 274 manages information on the status of the non-IP node whether the power is on or not, or whether it is inserted in the home-network 260 or not. Furthermore, the proxy server 274 manages private IP addresses having being allocated for the non-IP device and information on the relationship between the private IP addresses of a number of non-IP devices and their hardware addresses. Such proxy server 274 can be provided separately from the master server 262 and the master server 262 can perform the function of the proxy server (274).

The devices in the home-network 260 are defined as the service clients when they require connections to other devices and defined as the service servers when the connection is requested by other devices. The service server awaits a service client's request with the self-provided access point open and gets connected when the service client's request enters.

The devices connected to the home-network 260 can either be service servers or service clients according to a connection request and connection provision. This is because the decision on whether the devices are to be used as service clients or service servers is made according to the operation condition of each device in the home-network 260. In other words, when a device is connected to the DHCP and demands allocation of a private IP address, the device becomes a service client and the DHCP becomes a service server. However, when a device operates according to other device request, the device becomes a service server.

The interface of the service server and the service client are divided into a direct interface and an indirect interface. The direct interface is a service server and a service client directly providing and receiving a data unit through an IP networking pass and the indirect interface is providing and receiving a data unit through a proxy server 274 between a service server and a service client in case the service server is a non-IP node.

Figure 3:
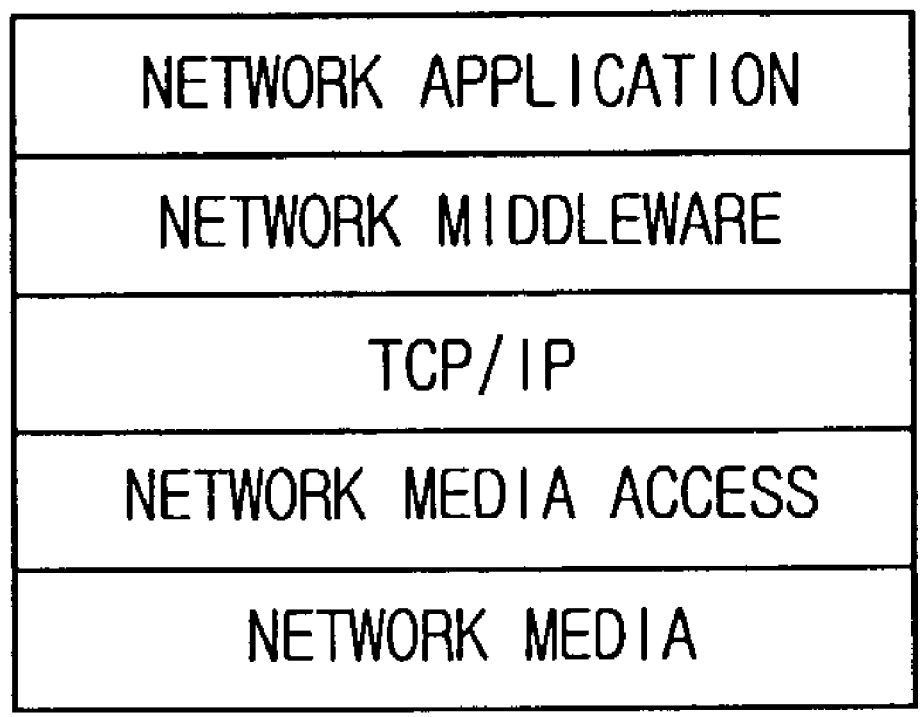
FIG. 3 is a drawing showing a protocol stack of a home network using middleware.

FIG. 3 is a drawing showing a protocol stack of a home-network using middleware.

The middleware is software for communications between devices in different categories and enables devices in a home network to communicate. The middleware is located in between an operating system and an application program, and transparently connects the scattered application and data in the client server environment.

In addition, the middleware is independently connected with hardware through a network in order to support various communication protocols, a system structure, an operating system, a database and an application program.

This middleware has a Transmission Control Protocol/Internet Protocol (TCP/IP) as a back-bone network and works with other protocol stacks such as the User Datagram Protocol (UDP) using a separate conversion device.

Figure 4:
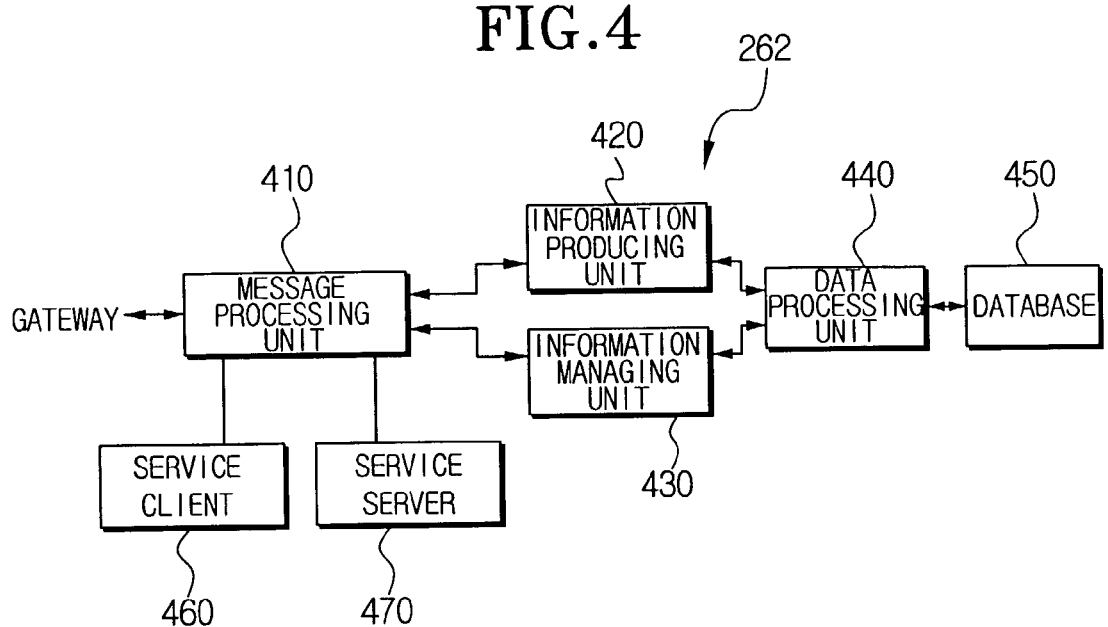
FIG. 4 is a block diagram showing the inner structure of an apparatus for providing device information through a network according to the present invention.

FIG. 4 is a block diagram showing the inner structure of an apparatus for providing device information through a network according to the present invention. In the present embodiment, the case in which the master server 262 functions as a device information providing device through a network is exemplified but a remote service providing device can be provided separately from the master server 262.

Referring to FIG. 4, the master server 262 comprises a message processing unit 410, an information producing unit 420, an information managing unit 430, a data processing unit 440, and database 450.

The message processing unit 410 processes message input to and output from the master server 262. The message processing unit 410 is connected with a service client 460 and a service server 470. The detailed description of the operation and structure of the service client 460 and the service server 470 is omitted as they are the same as the already provided description.

The message processing unit 410 has a function for registering information on the devices in the home network 260, i.e., announce, and a function for polling the devices capable of accessing. When the message processing unit 410 receives a registration request message from the domestic devices 460, 470, the information of the domestic devices 460, 470 included in the received registration request message is recorded to the database 450 after converting according to the data structure managing the home information. The message processing unit 410 also registers additional information of a corresponding device provided by the information managing unit 430 at the time of registering the basic information. The registration request message is formed in the XML format and includes the basic information of the corresponding device, a service list, a status parameter list, etc. The basic information includes IP address of the corresponding device, and types such as a device type, a serial number, a manufacturer, a model, etc.

In addition, the registration request message includes a group of the service interfaces for servicing the corresponding devices provided. The message processing unit 410 may provide information on the functions of the corresponding devices to a user by using the service interface group, and when the service having such function is provided, a remote calling can be performed by using the location information with respect to the function included in the interface.

Meanwhile, when the information of the domestic devices 460, 470 is registered, the status parameter list is also registered. The status parameter list includes all information about the status information required by the corresponding devices. The message processing unit 410 maintains the relationship of the status parameter relevant to the service by linking the location of the status parameter required by the service with reference to the status parameter list.

The status parameter other than a true value is closely related to an event message. In other words, in case the true value is required, the real value is requested to the corresponding device by using the location information.

The information producing unit 420 dynamically produces updated information based on the data stored in the database 450 and provides it to the device having the user interface in responding to the information provision request of the device having the user interface in the home network 260 and the internet 230. "Dynamically" here means producing a new format data by processing the logically based data. The information producing unit 420 produces information in a web document format. Such information producing unit 420 performs a function of a web server in relation to the message requested by the internet.

The information managing unit 430 provides additional information of a device, such as the location information of the device and the device identification name within the home network 260. The additional information is input by a user when the device is registered. When there is no additional information input by the user, the information managing unit 430 produces the additional information. The device does not manage the additional information but the information managing unit 430 does. The information managing unit 430 can perform a function of a DNS server by using the location information and the identification name of the device. The types of the device included in the device basic information mean a category to which a device belongs such as a Digital Versatile Disk Player (DVDP) and a High Definition Television (HDTV). The identification name means a unique code or a name identifying the device within the network.

The data processing unit 440 processes a transaction about the data stored in the database 450. The data processing unit 440 includes an XML parser as the structure of the data stored in the database 450 is comprised of XML. In addition, the data processing unit 440 provides an interface to enable the inquiry processing using a parser for data access of the transaction occurring between the information producing unit 420 and the information managing unit 430.

The database 450 stores information such as characteristic information and additional information on the devices in the home network 260. The data stored in the database 450 is managed by the XML for making the connection with the internet easy, for maintaining the semantics, and for corresponding to the various forms of inquiries.

Figure 5:
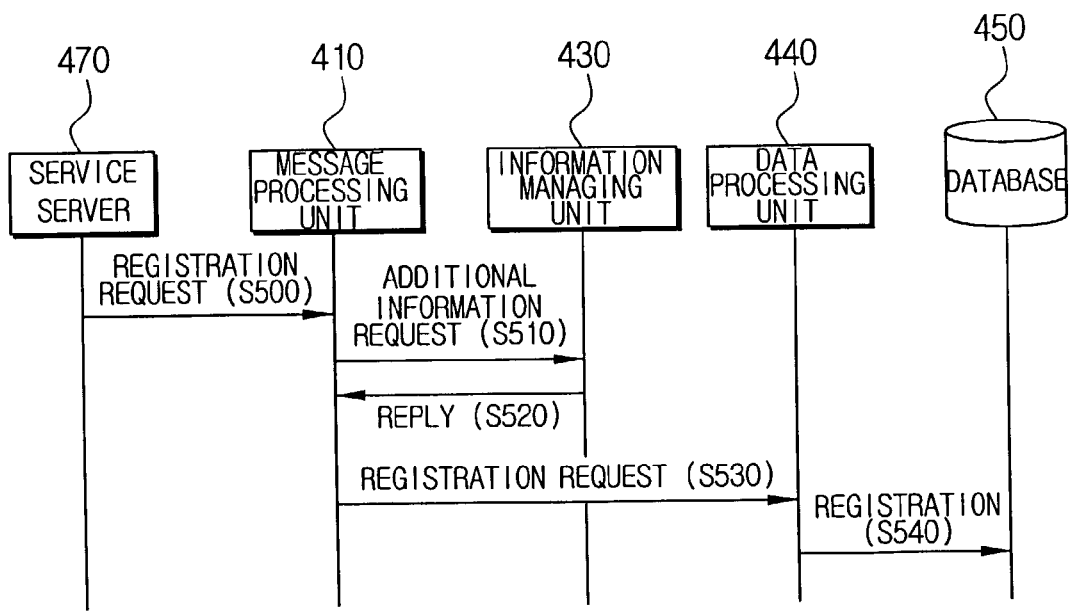
FIG. 5 is a flowchart showing the process of registering device information in database.

FIG. 5 is a flowchart showing the process of registering device information in database.

Referring to FIG. 5, the service server 470, for example a VCR connected to the home network 260, requests registration to the message processing unit 410 (S500). At the time of registration request, the message transferred from the service server 470 to the message processing unit 410 includes characteristic information such as a type of the device and manufacturer. The message processing unit 410 requests additional information about the device to the information managing unit 430 (S510). The information managing unit 430 provides the additional information to the message processing unit 410 (S520). The information managing unit 430 outputs the additional information input screen to the home browser and receives the additional information such as location information, for example, a master room, a lounge, and a kitchen, of the corresponding device and a unique name, for example a VCR1 or VCR2. If there is no input from the user, the information managing unit 430 generates a default value and produces the additional information. The message processing unit 410 transforms the characteristic information and the additional information of the device requested registration into the database schema and transmits the characteristic information and the additional information to the data processing unit 440. The data processing unit 440 registers the received characteristic information and the additional information in the database 450 (S540).

Figure 6:
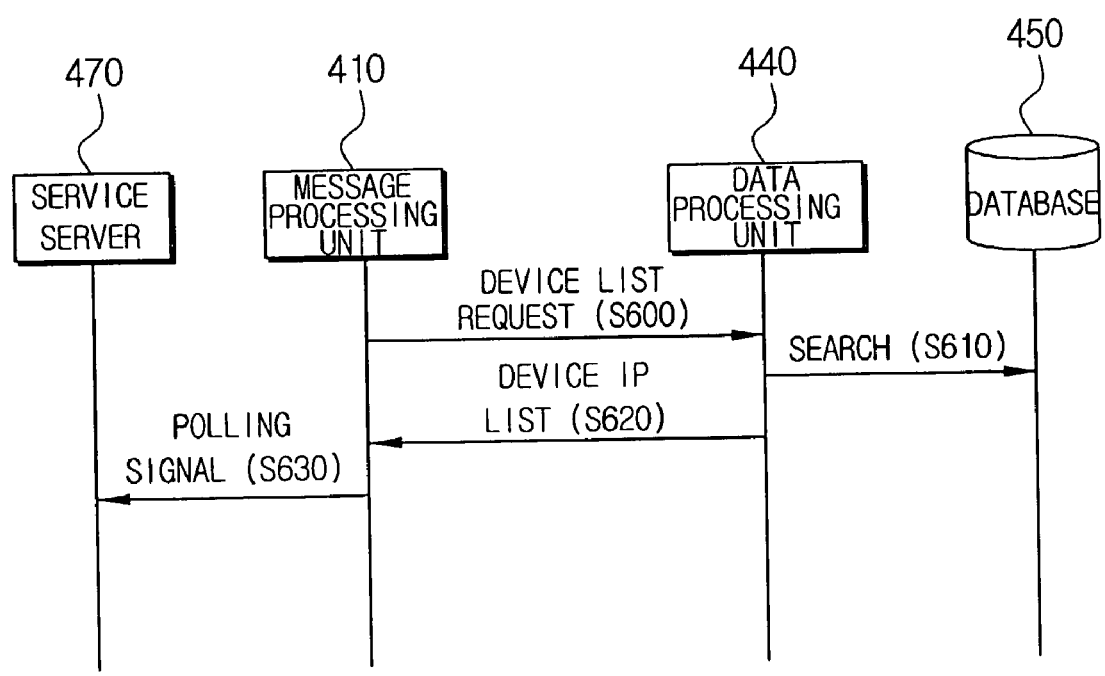
FIG. 6 is a flowchart showing the process of polling the devices connected to the home network.

FIG. 6 is a flowchart showing the process of polling the devices connected to the home network.

Referring to FIG. 6, the message processing unit 410 requests a list of the devices registered in the database 450 to the data processing unit 440 according to a polling signal that is periodically input (S600). The data processing unit 440 reads the list of the registered devices from the database 450 (S610). The read device list is transferred to the message processing unit 410 (S620). The message processing unit 410 transmits a polling message to each device based on the received device list (S630). The polling message includes request information on the current status of each device such as whether the power is on or off. The message processing unit 410 checks if each device is in active mode or not by using the polling message. The device in reception of the polling message sends a reply message back. The message processing unit 410 maintains the device information for the devices receiving the reply message and deletes the information on the devices from the database 450 for the devices which did not receive the reply message.

Figure 7:
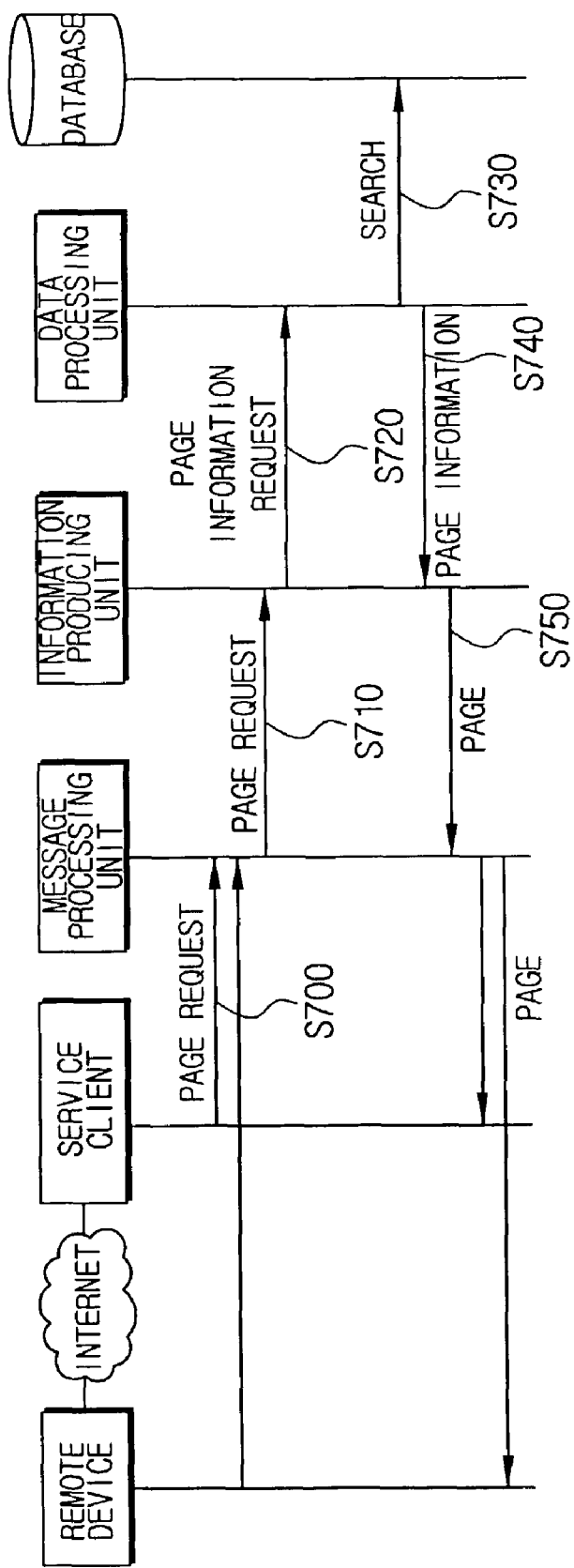
FIG. 7 is a flowchart showing the process of providing information on the devices in a home network to remote devices connected to the home network.

FIG. 7 is a flowchart showing the process of providing information on the devices in a home network to remote devices connected to the home network.

Referring to FIG. 7, a remote user connects to the home-network 260 using the remote device 1 220 connected with the internet 230 and then requests information on the devices in the home-network 260 (S700). During this process, the master server 262 performs a certification process for the remote user to connect to the master server 262. The detailed description of a user certification technology is omitted as those skilled in the art may easily obtain the information on such technology. Meanwhile, the remote user is allowed to access only the master server 262 acting as an agent of the device through the remote device 220. Accordingly, each remote user can be given access authority having a different access limit to one another. For example, a particular user can be given an access only to the devices in the master room. The user certification related information is stored in the database 450 and the user certification process is performed in the separate user certificate unit (not shown). Hereinafter, the description will be based on the case that the remote user is given an access authority for all devices in the home-network 260.

The message processing unit 410 requests information to the information producing unit 420 after interpreting information request message received from the remote device 1 220 (S710). The information request message includes a request for overall information on the devices in the home-network 260. The information request message may also include a request for information on a particular device in the home-network 260. If a request for overall information on the devices in the home-network 260 is received, the information producing unit 420 requests a list of the devices, basic information, and additional information to the data processing unit 440 (S720). In the step of S720, if the request for information on a particular device in the home-network 260 is received, the information producing unit 420 requests basic information and additional information on the corresponding device to the data processing unit 440.

The data processing unit 440 reads information requested from the database 450 (S730) and provides it to the information producing unit 420. The information transferred from the data processing unit 440 to the information producing unit 420 is an XML document. The information producing unit 420 converts the received XML document to a HTML document and provides it to the remote device 1 220 (S750).

According to the apparatus for providing device information via network and method thereof based on the present invention, intelligent network service development such as remote control and remote management through the internet is possible by providing information on the devices in a home network not through each device but through a separate apparatus. In addition, remote users can have different access authority from each other by assuring independence between domestic devices and remote devices and a credibility of the system can be improved by filtering a wrong access since the access of the remote device connecting from the internet to the home network is allowed only until a device information providing device acting as an agent of each device. Furthermore, the user can easily use the home network service by providing the device information in a dynamically produced web document format to the remote device.

Although the preferred embodiment of the present invention has been described, it will be understood by those skilled in the art that the present invention should not be limited to the described preferred embodiment. Various changes and modifications can be made within the spirit and scope of the present invention as defined by the appended claims.

What is claimed is:

1. An apparatus for providing device information via a network comprising:
 a message processing unit which converts device information, including at least one of basic information, a service list, and a status parameter list, of a domestic device into database schema based on a registration request message received from the domestic device;
 a storage unit which stores the converted device information of the domestic device;
 a data processing unit which processes a transaction of the device information in an Extensible Markup Language format stored in the storage unit in responding to a information request of the domestic device; and
 an information producing unit which produces device information in a web page format based on the device information in the XML format received from the data processing unit and provides the produced device information in the web page format to the message processing unit when a request for information is made by a user;
 wherein the message processing unit outputs a polling message for polling whether the domestic device is in an active mode or not, and renews the device information of the domestic device stored in the storage unit based on a reply message to the polling message received from the domestic device.

2. The apparatus for providing device information via a network in claim 1, further comprising an information managing unit which receives additional information including at least one of location information and identification information of the domestic device from a user and provides the received additional information to the message processing unit when registering the domestic device, and wherein the message processing unit requests the additional information from the information managing unit when the registration request message is received from the domestic device.

3. The apparatus for providing device information via a network in claim 1, wherein the basic information comprises device type information including at least one of a device type, a serial number, and manufacturer, and a device ID assigned to the domestic device.

4. An apparatus for providing device information via a network comprising:
 a message processing unit which converts device information of a domestic device into database schema based on a registration request message received from the domestic device;
 a storage unit which stores the converted device information of the domestic device;
 a data processing unit which processes a transaction of the device information in an Internet language format stored in the storage unit in responding to an information request of the domestic device; and
 an information producing unit which produces device information in a web page format based on the device information in the Internet language format received from the data processing unit and provides the produced device information in the web page format to the message processing unit when a request for information is made by a user;
 wherein the message processing unit outputs a polling message for polling whether the domestic device is in an active mode or not, and renews the device information of the domestic device stored in the storage unit based on a reply message to the polling message received from the domestic device.

5. The apparatus for providing device information via network in claim 4, wherein the Internet language format is an XML format.

6. The apparatus for providing device information via a network in claim 4, further comprising an information managing unit which receives additional information including at least one of location information and identification information of the domestic device from a user and provides the received additional information to the message processing unit when registering the domestic device, and wherein the message processing unit requests the additional information from the information managing unit when the registration request message is received from the domestic device.

7. The apparatus for providing device information via a network in claim 4, wherein the device information includes at least one of basic information, a service list, and a status parameter list of the domestic device.

8. The apparatus for providing device information via a network in claim 7, wherein the basic information comprises device type information including at least one of a device type, a serial number, and manufacturer, and a device ID assigned to the domestic device.

* * * * *